United States Patent [19]

Sweeney

[11] Patent Number: 4,586,717
[45] Date of Patent: May 6, 1986

[54] THROTTLING BUSHING FOR SHAFT SEAL

[75] Inventor: William T. Sweeney, Ponca City, Okla.

[73] Assignee: Conoco Inc., Ponca City, Okla.

[21] Appl. No.: 219,748

[22] Filed: Dec. 24, 1980

[51] Int. Cl.$^4$ .............................................. F16J 15/34
[52] U.S. Cl. ......................................... 277/15; 277/53
[58] Field of Search ................................... 277/15, 53

[56] References Cited

U.S. PATENT DOCUMENTS

| | | | |
|---|---|---|---|
| 2,824,759 | 2/1958 | Tracy | 277/15 |
| 2,998,991 | 9/1961 | Spencer | 277/53 |
| 3,096,985 | 7/1963 | Biheller | 277/53 |
| 3,236,529 | 2/1966 | Heim | 277/15 |
| 3,666,276 | 5/1972 | Hubler | 277/53 |
| 4,146,238 | 3/1979 | Gaffal | 277/15 |
| 4,257,735 | 3/1981 | Bradley et al. | 277/53 |

OTHER PUBLICATIONS

Borg-Warner Catalog Type BX, BXC & BXT Mechanical Seals-No. 1863-11.
Borg-Warner Catalog Type BX Mechanical Seals-No. 1863-3.2.

Primary Examiner—Robert I. Smith
Attorney, Agent, or Firm—William J. Miller; Cortlan R. Schupbach

[57] ABSTRACT

An improved throttling bushing for a seal is used in a machine which has a casing and a shaft journaled in the casing. The throttling bushing reduces the flow of cooling and flushing fluid by maintaining a closer tolerance at the throttling bushing by using a labyrinth mounted on the shaft or a sleeve attached to the shaft, and an elastic bushing attached to the casing and positioned around the labyrinth. The clearance between the elastic bushing of the labyrinth is dimensioned to provide non-contact clearance prior to assembly.

1 Claim, 4 Drawing Figures

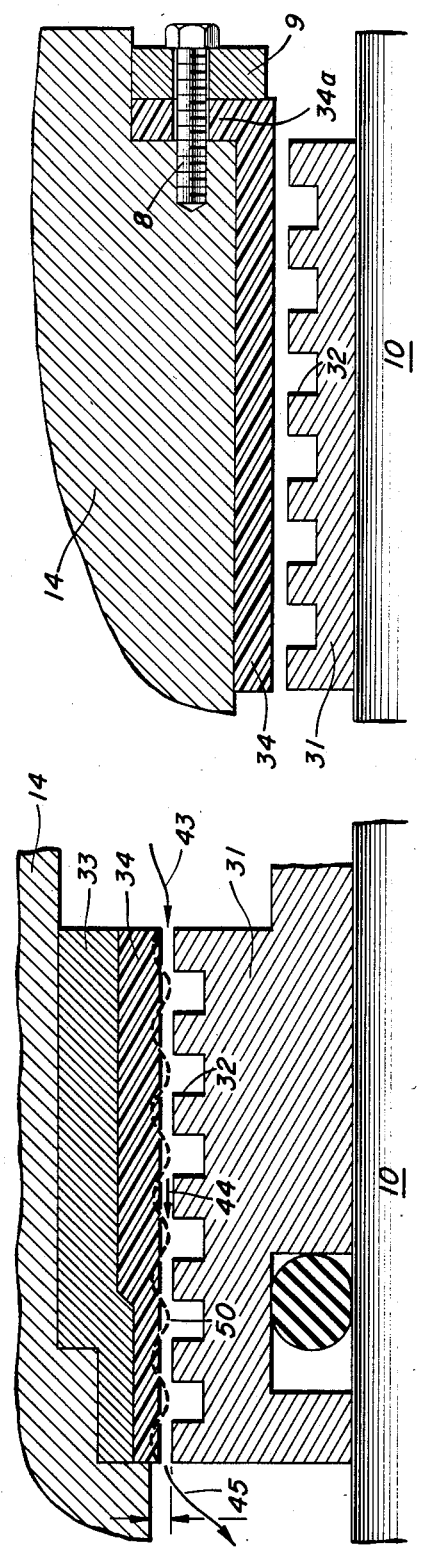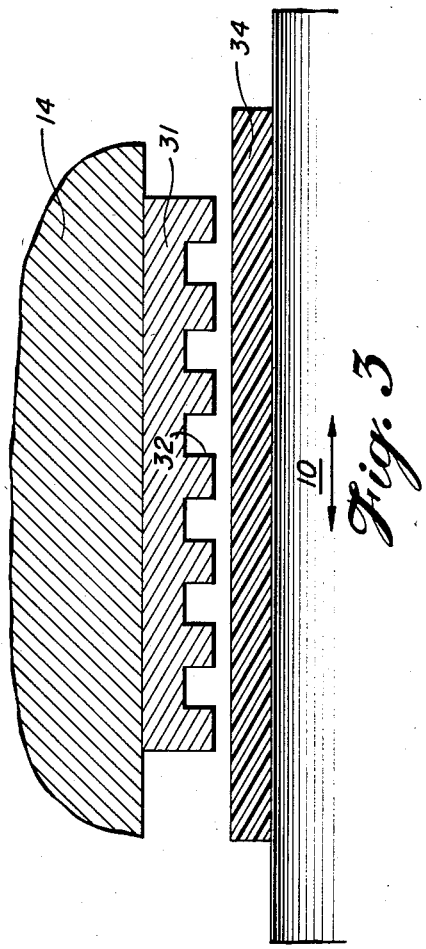

THROTTLING BUSHING FOR SHAFT SEAL

PRIOR ART DISCUSSION

The best prior art known to Applicant is a Borg-Warner mechanical seal type BXT which contains a throttling bushing which is improved upon by the invention herein described. In that seal, a sleeve has mounted on it a bellows assembly with a rotating face which is biased against a T-shaped stationary face. The sleeve is secured to the shaft by a drive collar. A passageway is provided for flushing fluid and coolant out an opening at the face end of the seal assembly.

BRIEF DESCRIPTION OF THE INVENTION

This invention relates to the above-described throttling bushing portion of the seal and is an improvement thereon and basically provides a throttling bushing for maintaining at a minimum the amount of flushing and cooling fluids which pass through the bushing. The invention basically comprises a labyrinth on the rotating portion of the throttling bushing with an elastic sleeve opposite the labyrinth and attached to a sleeve on the stationary portion of the bushing facing the shaft sleeve. The elastic sleeve permits closer tolerances between the elastic sleeve surface and the labyrinth surface, thereby permitting substantially reduced flow of cooling and purging fluids through the seal.

BRIEF DESCRIPTION OF THE FIGURES

FIG. 2 is an enlarged section of the improved portion of the throttling bushing;

FIG. 3 is a partial cutaway view of a variation in the labyrinth arrangement; and FIG. 4 is a variation in the attachment of the elastic sleeve to the machine housing.

DETAILED DESCRIPTION OF THE INVENTION

Figure 1:
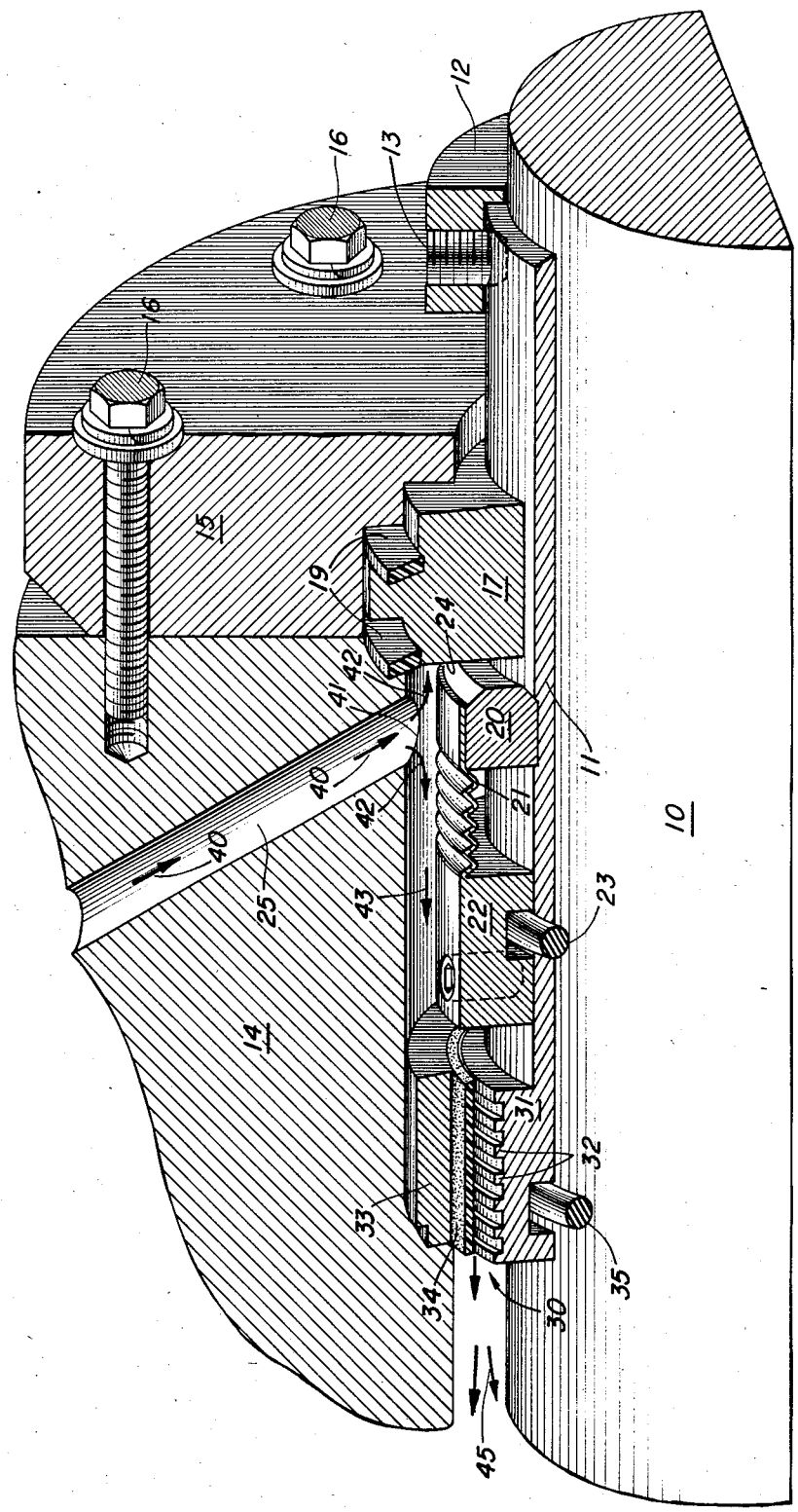
FIG. 1 is a partially cut away view of a seal illustrating the improved control of the purging and cooling fluids.

Referring to FIGS. 1 and 2, a shaft, generally referred to by number 10, has a sleeve 11 mounted over said shaft. Sleeve 11 is anchored to the shaft by a drive collar 12 which is secured to the shaft by a set screws 13. The drive collar is illustrated with one cut away portion of a set screw. It is obvious that one or more set screws can be used to anchor drive collar 12.

The entire seal assembly is mounted between shaft 10 and machine casing 14. A flange 15 is attached to casing 14 by several bolts 16 which are spaced around flange 15 for the purpose of rigidly securing the flange to casing 14. A stationary seal face having a T-shape 17 is secured by flange 15 and has seal 19 for preventing fluids from passing around T-shaped seal face 17. Seal face 17 can be made of a number of materials; however, the face is generally made of a hard material such as silicon carbide.

The rotating portion of the seal comprises a rotating seal face 20, a bellows arrangement 21, and a drive sleeve 22. Drive sleeve 22 is provided with an O-ring seal 23 to prevent fluids from passing under drive sleeve 22 and between sleeve 11. Rotating face 20 is likewise made of a hard material of different composition than the silicon carbide of T-shape stationary seal face 17. Rotating face 20 can be made of a material such as tungsten carbide. Such material and the construction of the apparatus described herein is well known in the art.

Bellows 21 provides not only a seal between rotating seal face 20 and drive sleeve 22 but also a bias or spring force against rotating face 20. With pressure against rotating face 20, a seal will be provided at the surfaces 24 which lie between rotating seal face 20 and stationary seal face 17.

A flushing and cooling fluid passageway 25 is provided through machine casing 14. The passageway will communicate to the outside of the casing where an attachment can be made which provides fluid to passage 25. The attachment and the particular passage can vary from machine installation to machine installation and is not illustrated in this drawing.

The novel inventive feature of this seal is illustrated by the throttling bushing generally referred to by arrow 30 and comprises an increased diameter portion 31 formed on sleeve 11. It is obvious of course that enlarged portion 31 can be a separate sleeve and rigidly attached to sleeve 11 by set screws welding and the like. Sleeve or collar portion 31 contains a labyrinth 32 on its outer surface, which rotates with shaft 10. A stationary bushing 33 is pressed or attached to machine casing 14 and has bonded thereto an elastic material 34 which can be composed of any number of materials such as natural rubber or plastic. In either case, the elastic material for sleeve 34 in the preferred embodiment is vulcanized or otherwise rigidly attached to stationary bushing 33. An O-ring 35 provides a seal between sleeve 11 and shaft 10.

OPERATION

Operation of the throttling device can be best described by referring to both FIGS. 1 and 2. In FIG. 1, cooling and flushing fluid flows down passageway 25 as indicated by arrows 40. As it reaches the terminus 41 of passageway 25, it continues in the direction of arrows 42. Part of the flushing and cooling fluid will strike rotating surface 24, providing lubrication and cooling for the surface. Fluids will also inpinge on the stationary T-shape seal face 17 and rotating seal face 20, providing cooling for the seal faces. The cooling and flushing material will continue in the direction of arrow 43, reaching the throttling bushing where (see FIG. 2) it will pass between the elastic bushing 34 and the labyrinth 31 as indicated by arrow 44 finally passing into the internal portion of the machine as indicated by arrow 45. One important requirement is that the pressure of the flushing and cooling fluid must exceed the pressure of the region where arrow 45 passes so that material accumulating in the region of arrow 45 will not pass against the flow of the flushing fluid thereby allowing contaminants to pass into the seal and between seal faces 24 causing wear, abrasion and eventual failure of the seal. If, for example, the machine is a slurry pump, the interior region of arrow 45 may be filled with highly abrasive and corrosive fluids and particulate matter. Such particulate matter could destroy the seal face 24 in a short period of time.

Therefore, it is extremely important that sufficient fluid continually pass down passageway 25 in order to provide sufficient flushing to prevent the influx of particulate matter to the seal faces 24. One of the problems in providing sufficient flushing material has been the large quantity of fluid required to provide adequate velocities to prevent the influx of particulate matter. One of the main problems in maintaining adequate flushing fluid has been the inability to provide a close enough tolerance between the stationary bushing and the rotating sleeve at the exit location for the flushing fluid. Part of the problem has been the inability to machine and assemble large shafts and casings with close enough tolerance in the seal, bearings etc. so that the material comprising the casing 14, for example, and shaft 10, will not rub when the units are assembled. This unit solves the problems of the prior art by providing a rubber or elastic bushing 34 which is attached to the stationary bushing 33. If misalignment of the shaft causes rubbing against the stationary bushing, the elastic material can accept the rubbing, within limits, and not cause sufficient wear to change the tolerances of the apparatus to a point where insufficient flushing fluid can be provided to maintain the bearing surface 24 free of particulate matter.

One additional advantage of the elastic material is that if the elastic material is touching or nearly touching the labyrinth 32, the elastic material will deform as illustrated by dotted lines 50 (see FIG. 2). The deformation of the elastic material will provide sufficient flushing fluid at adequate flowrates to prevent the reverse flow of particulate matter into the seal. The deformation is caused by the variation in pressure along labyrinth 32, for example, as the fluids flow between the tops of labyrinth 32 and the elastic material 34, the pressure drop will be high. As it flows to the low portion of the labyrinth, the pressure drop will reduce causing an equal distribution of flushing fluid around the labyrinth. The distribution of flushing fluid will provide a continual flushing of the material completely around the throttling bushing thereby preventing excessive wear of the elastic material and providing adequate flushing and equalization of pressure differential which will maintain the seal free of particulate matter.

Modifications in the throttling bushing are illustrated in FIGS. 3 and 4. In FIG. 3, shaft 10 has the elastic sleeve 34 formed around it and secured against movement by vulcanizing, static pressure, adhesives or any other means. The labyrinth 32 is attached to the machine casing 14. This configuration is particularly well adapted to a reciprocating shaft. The elastic portion 34 can be made to cover the labyrinth 32 throughout the entire stroke of shaft 10. It is obvious, of course, that labyrinth 32 and elastic material 34 can be renewed.

FIG. 4 illustrates a means of attaching the elastic material without requiring a sleeve. In this FIGURE, elastic sleeve 34 fits snugly inside the casing 14. A shoulder 34-a on elastic sleeve 34 retains the sleeve against the differential pressure developed by the flushing fluid. A flange 9 secured by bolts 8 may be used to retain the elastic sleeve 34 and shoulder 34-a if necessary.

CONCLUSION

An invention has been described which adequately controls the movement of flushing fluid from a seal into the interior of a pump or other machine. The elastic material provides unique qualities in that it will permit close telerances between the stationary portion and the rotating portion of the throttling bushing. It will also cause an equal distribution of material around the throttling bushing preventing excessive wear and providing sufficient flushing to prevent particulate matter from moving from the interior of the machine to the seal. It should also be understood that this invention is useful wherever a throttling bushing is needed, and is not limited to the particular example disclosed.

It is obvious that other modifications and changes may be made in the invention as described in the specification and appended claims without departing from the spirit and scope of this invention.

What I claim is:

1. A throttling bushing for an apparatus which includes a casing, a shaft journaled in said casing, a seal between said shaft and said casing, and fluid application means for cooling and flushing said seal, comprising:
   labryinth means secured to said shaft to define a concentric labryinthine surface;
   cylindrical bushing means secured within said casing for disposition adjacent said labryinth means and annularly spaced therefrom;
   elastic means of cylindrical shape rigidly secured within said bushing means with the inner diameter of said elastic means disposed concentrically at a selected small spacing from the concentric definition of said labryinth means so that the elastic means may be stressed by fluid under pressure to allow passage of a selected amount of cooling and lubricating fluid; and
   means secured to said bushing means and elastic means for retention against dislodgment relative to said casing.

* * * * *